United States Patent
Buyuktosunoglu et al.

(10) Patent No.: US 9,182,991 B2
(45) Date of Patent: Nov. 10, 2015

(54) MULTI-THREADED PROCESSOR INSTRUCTION BALANCING THROUGH INSTRUCTION UNCERTAINTY

(75) Inventors: Alper Buyuktosunoglu, White Plains, NY (US); Brian R. Prasky, Wappingers Falls, NY (US); Vijayalakshmi Srinivasan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 944 days.

(21) Appl. No.: 13/366,999

(22) Filed: Feb. 6, 2012

(65) Prior Publication Data

US 2013/0205118 A1 Aug. 8, 2013

(51) Int. Cl.
G06F 9/38 (2006.01)

(52) U.S. Cl.
CPC ............ G06F 9/3844 (2013.01); G06F 9/3851 (2013.01)

(58) Field of Classification Search
CPC ............................ G06F 9/30058; G06F 9/3844
See application file for complete search history.

(56) References Cited

U.S. PATENT DOCUMENTS

| | | | |
|---|---|---|---|
| 5,553,255 A | 9/1996 | Jain et al. | |
| 6,282,663 B1 | 8/2001 | Khazam | |
| 6,425,076 B1 | 7/2002 | Killian | |
| 6,697,932 B1 | 2/2004 | Yoaz et al. | |
| 6,766,441 B2 | 7/2004 | Sinharoy | |
| 7,035,997 B1 | 4/2006 | Musoll et al. | |
| 7,051,192 B2 | 5/2006 | Chaudhry et al. | |
| 7,627,742 B2 | 12/2009 | Bose et al. | |
| 7,707,391 B2 | 4/2010 | Musoll et al. | |
| 7,707,396 B2 | 4/2010 | Bradford et al. | |
| 7,805,595 B2 | 9/2010 | Ozer et al. | |
| 7,979,725 B2 | 7/2011 | Atkinson | |
| 2005/0060518 A1 | 3/2005 | Augsburg et al. | |
| 2006/0161762 A1 | 7/2006 | Eisen et al. | |
| 2007/0061554 A1 | 3/2007 | Worrell | |
| 2008/0244223 A1 | 10/2008 | Quinones et al. | |
| 2008/0256345 A1* | 10/2008 | Bose et al. ................... | 712/239 |
| 2009/0063819 A1* | 3/2009 | Doing et al. ................. | 712/205 |
| 2009/0193231 A1 | 7/2009 | Gschwind et al. | |

(Continued)

FOREIGN PATENT DOCUMENTS

WO    0206959 A1    1/2002

OTHER PUBLICATIONS

UK International Search Report and Written Opinion of International Application No. PCT/EP2013/051285; International Filing Date: Jan. 24, 2013; Date of mailing: Mar. 1, 2013, 8 pages.

(Continued)

*Primary Examiner* — Benjamin Geib
(74) *Attorney, Agent, or Firm* — Cantor Colburn LLP; Margaret McNamara

(57) ABSTRACT

A computer system for instruction execution includes a processor having a pipeline. The system is configured to perform a method including fetching, in the pipeline, a plurality of instructions, wherein the plurality of instructions includes a plurality of branch instructions, for each of the plurality of branch instructions, assigning a branch uncertainty to each of the plurality of branch instructions, for each of the plurality of instructions, assigning an instruction uncertainty that is a summation of branch uncertainties of older unresolved branches and balancing the instructions, based on a current summation of instruction uncertainty, in the pipeline.

12 Claims, 7 Drawing Sheets

(56) References Cited

U.S. PATENT DOCUMENTS

2009/0287912 A1    11/2009   Sendag
2011/0060889 A1     3/2011   Burger et al.
2011/0320774 A1*   12/2011   Jacobi et al. .................. 712/205
2012/0124345 A1*    5/2012   Denman et al. ............... 712/237

OTHER PUBLICATIONS

Aragon et al.. "Power-Aware Control Speculation through Selective Throttling", Ninth International Symposium on High-Performance Computer Architecture, 2003, pp. 103-112.

Kang et al., "Speculation control for simultaneous multithreading". In Proceedings of the 18th International Parallel and Distributed Processing Symposium (IPDFS'04). 76-85.

Luo et al., "Balancing Throughput and Fairness in SMT Processors", in Proc Intl. Symp. on Performance Analysis of Systems and Software, 2001, 164-171.

Manne et al., "Pipeline Gating: Speculation Control for Energy Reduction". In Proceedings of the 25th Annual International Symposium on Computer Architecture, ISCA-25, pp. 132-141, Barcelona, Spain, 1998.

* cited by examiner

| | | | |
|---|---|---|---|
| 420 → | 0 | INSTR 0 | INSTR 0 | INSTR 0 |
| 430 → | 0 | BR(1) 0 | INSTR 1 | BR(3) 1 |
| 440 → | 4 | INSTR 4 | INSTR 4 | INSTR 4 |
| 450 → | 4 | INSTR 4 | BR(2) 4 | N/A - |
| 460 → | 6 | INSTR 6 | INSTR 6 | INSTR 6 |

FIG. 4

MULTI-THREADED PROCESSOR INSTRUCTION BALANCING THROUGH INSTRUCTION UNCERTAINTY

BACKGROUND

The present invention relates to multi-threaded processing, and more specifically, to systems, methods and computer program products for instruction balancing within a multi-threaded processor through instruction uncertainty.

There are many goals in a multi-threaded pipeline design, including but not limited to running each individual thread as fast as possible, and optimizing units of work per watt. Pipelining is one specific form of parallelism, where the execution of several instructions can be interleaved on the same hardware. Regardless of the goal of the pipeline design, for each thread of a program, multiple branch instructions can be encountered. When a thread experiences a branch, a prediction is made which direction the branch will take, and then the thread is executed along the predicted path. Branch prediction is typically implemented with a 2-bit saturating counter, per branch prediction table entry, where the states are: 00 (strongly not taken), weakly not taken (01), weakly taken (10) and strongly taken (11). On a resolved taken branch the counter increments; however, upon reaching a state of "11", the counter saturates at this value. On a resolved not taken branch the counter decrements; however, upon reaching a state of "00", the counter saturates at this value. A branch is predicted as taken for states "10" and "11" and a branch is predicted as not taken for states "00" and "01". This saturating counter provides a direction for the branch; however, states nothing about the accuracy of the branch. For example on a for loop, the branch is taken every time except the fall-through case. On the fall-through iteration the confidence counter is degraded from "11" to "10". The next time the for loop is encountered the branch will be taken again. As such, in a state of "11" the branch is taken for all but the fall-through encountering. On a state of "10", the branch will be taken again. As such, a strong state does not indicate a more confident prediction than that of a weak state. What is not taken into account in such a scheme in making the prediction is the accuracy of the branch prediction. In a multi-threaded processing environment, multiple threads can simultaneously perform work. As such, multiple threads may be running in a pipeline, each thread encountering multiple branches, and propagating predicted state (strong/weakly taken/not taken) through the pipeline such that upon branch resolution the prediction state within the branch table can be updated. Additionally in a multi-threaded processor, there are resources which are shared among the threads. These dynamically divided resources are on a first come first serve basis. While dynamic resources allow for silicon area and power optimization, there are many performance limitations of a dynamic resource such as thread hogging which creates a performance limiter. For example, when one thread, X, is stalled, the other thread, Y, has the ability to utilize up a significant amount of the pipeline resources. Thread Y may be creating throw-away work (as for example down a to be determined branch wrong path) and taking resources from X which X could use in the near future for work which is not throw-away.

SUMMARY

Exemplary embodiments include a computer system for instruction execution, the system including a processor having a pipeline, wherein the system is configured to perform a method, including fetching, in the pipeline, a plurality of instructions, wherein the plurality of instructions includes a plurality of branch instructions, for each of the plurality of branch instructions, assigning a branch uncertainty to each of the plurality of branch instructions, for each of the plurality of instructions, assigning an instruction uncertainty that is a summation of branch uncertainties of older unresolved branches and balancing the instructions, based on a current summation of instruction uncertainty, in the pipeline.

Further exemplary embodiments include a computer program product for instruction execution in a pipeline. The computer program product includes a tangible storage medium readable by a processing circuit and storing instructions for execution by the processing circuit for performing a method. The method includes fetching, in the pipeline, a plurality of instructions, wherein the plurality of instructions includes a plurality of branch instructions, for each of the plurality of branch instructions, assigning a branch uncertainty to each of the plurality of branch instructions, for each of the plurality of instructions, assigning an instruction uncertainty that is a summation of branch uncertainties of older unresolved branches, and balancing the instructions, based on a current summation of instruction uncertainty, in the pipeline.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 4 illustrates an example of a table that can be implemented to track uncertainty in the pipeline;

DETAILED DESCRIPTION

In exemplary embodiments, the systems and methods implement simultaneous multi-threading in a processor to allow the processor core to achieve higher throughput (i.e., more work) per transistor. In a given pipeline, the systems and methods described herein not only calculate the direction of each predicted path, but also calculate a confidence/accuracy for each predicted path. In addition, an uncertainty for a predicted branch is tracked and propagated through each predicted branch in order to make decisions about the order of instructions to execute from each thread. By allowing the threads to be in a "free-for-all" and claim as many resources as each thread desires as long as there are resources available, the resources do not get divided among the threads in a means that goes after achieving the maximum throughout possible. One region of increased throughput fairness is around that of branches. Whenever a given thread is more likely (with respect to the other thread) to get the direction/target predicted incorrectly for a given branch, it should back off on the resources being consumed/requested and allow the other (i.e., more confident) thread to claim its share of resources. In a single threaded processor, all resources are dedicated to the single thread. In a simultaneous multithreading (SMT) processor, these resources are "shared" among the concurrently executing threads. Some resources are statically divided while other resources are dynamically divided. The dynamically divided resources are on a first come first serve basis. While dynamic resources allow for optimization, there are many performance limitations of a dynamic resource. For example, when thread X is stalled for a few cycles, thread Y has the ability to utilize a significant amount of the pipeline resources. Thread Y may be creating throw-away work (e.g., down a branch wrong path) and taking resources from thread X that thread X could use for work which is not throw-away upon overcoming the stall.

Figure 1:
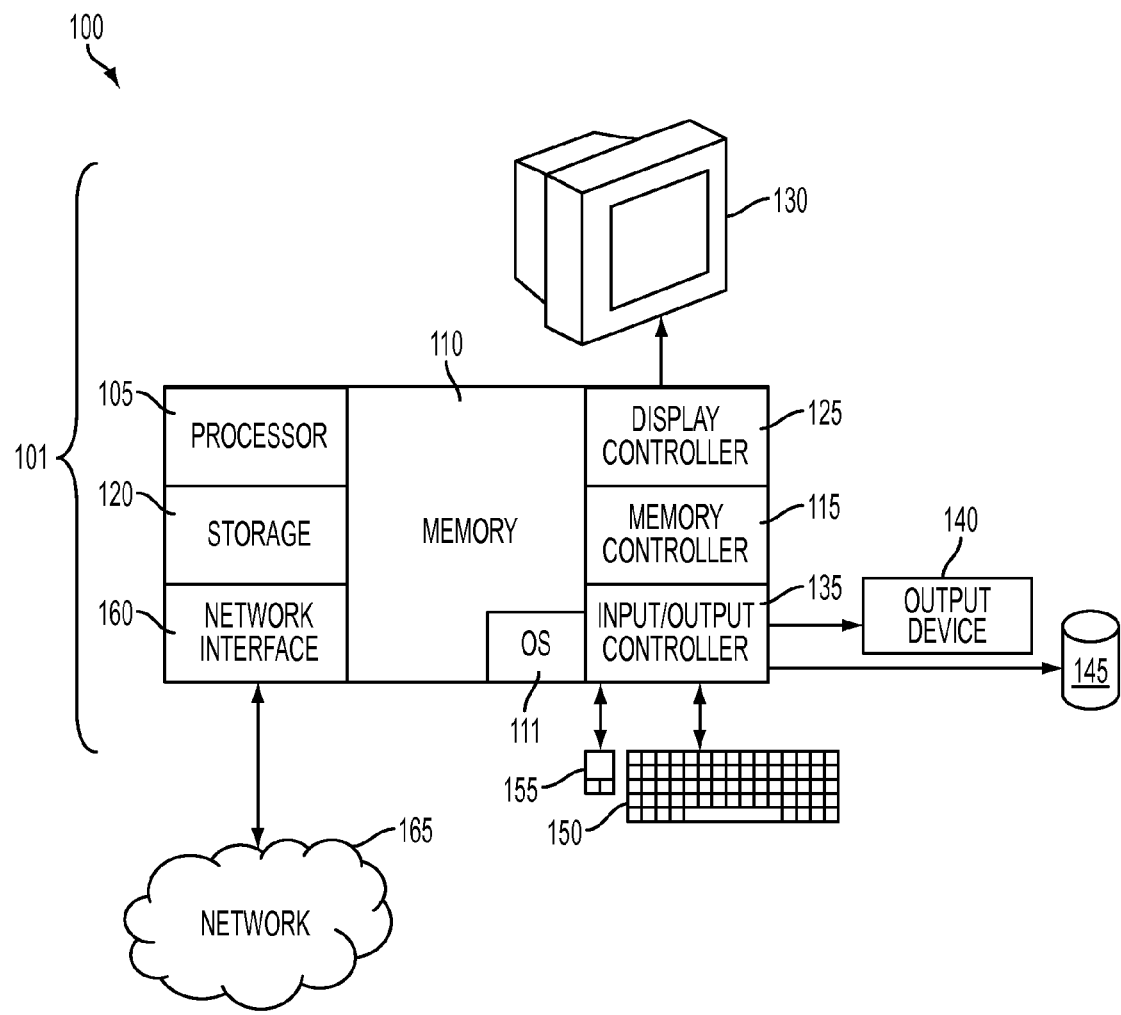
FIG. 1 illustrates a block diagram of a system 100 for instruction balancing within a multi-threaded processor through instruction uncertainty.

FIG. 1 illustrates a block diagram of a system 100 for instruction balancing within a multi-threaded processor through instruction uncertainty. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 100 therefore includes general-purpose computer 101.

In an exemplary embodiment, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute instructions stored within the memory 110, to communicate data to and from the memory 110, and to generally control operations of the computer 101 pursuant to the instructions.

In an exemplary embodiment, where the instruction balancing methods are implemented in hardware, the instruction balancing methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
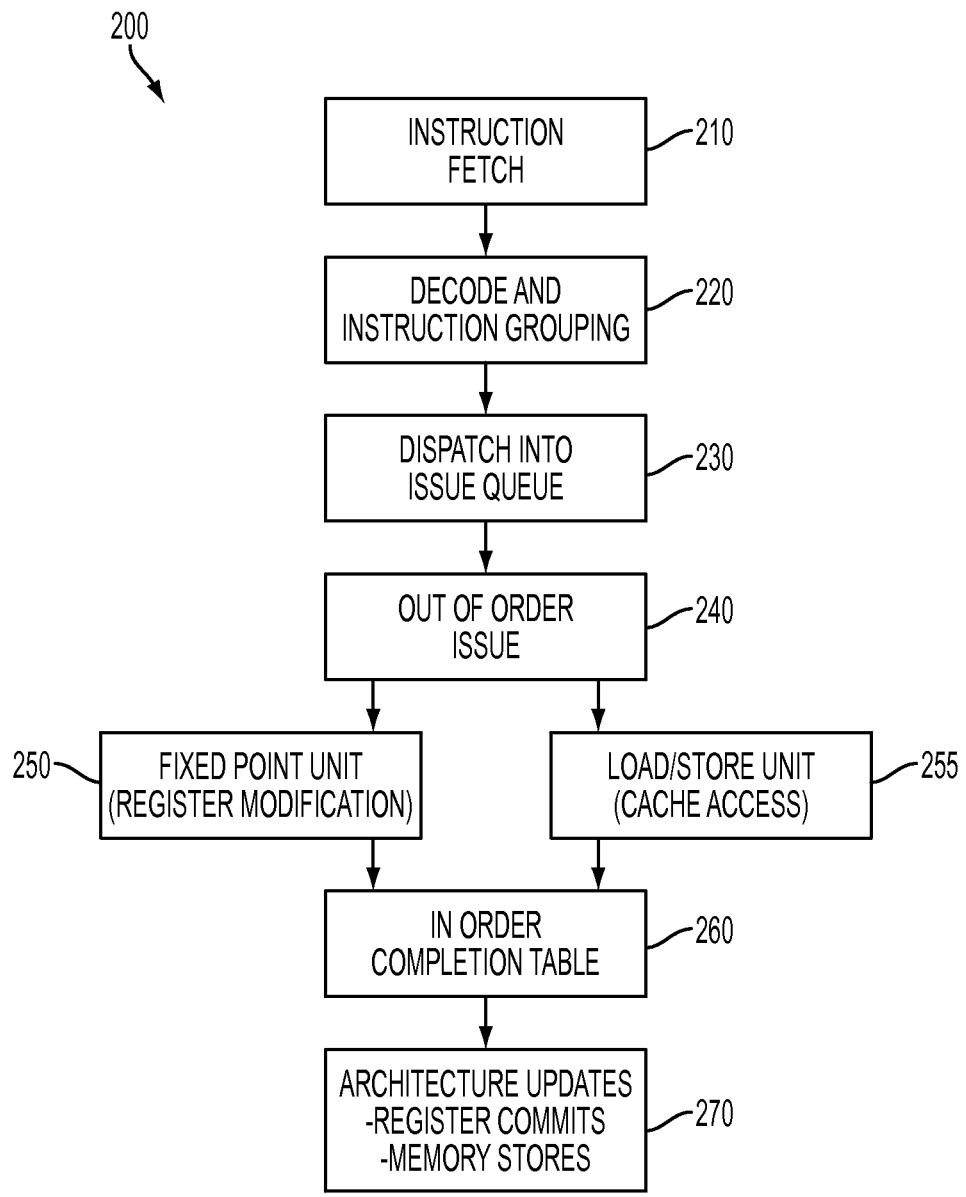
FIG. 2 illustrates a block diagram of a processor instruction pipeline system in which the exemplary instruction balancing methods can be implemented in accordance with an exemplary embodiment.

FIG. 2 illustrates a block diagram of a processor's out-of-order instruction pipeline system 200 in which the exemplary instruction balancing methods can be implemented in accordance with an exemplary embodiment. As described herein, pipelining is one specific form of parallelism, where the execution of several instructions can be interleaved on the same hardware. In an exemplary embodiment, the pipeline system includes seven stages: (1) Instruction fetch 210; (2) Decode and instruction grouping 220; (3) Dispatch into issue queue 230; (4) Out of order issue 240; (5a) Fixed point unit which performs register modifications 250; (5b) Load/Store unit which accesses the cache 255; (6) In order completion table 260; (7) Architecture updates which includes register commits and memory stores 270. In an exemplary embodiment, the instruction fetch 210 stage fetches instructions to be processed. The Decode and instruction grouping 220 stage decodes the instruction and determines which instructions are dependent on which instructions. The Dispatch into issue queue 230 places the instructions and associated dependencies into the issue queue. The Out of order issue queue 240, defines which instructions are to be sent to the execution units which perform an architecture function. The Fixed point unit 250 performs a register to register operation. The Load/Store unit 255 will take a register value and place it into memory/cache or take content in memory/cache and place it into a register. The in order completion 260 defines an in-order means to send instructions to the Architecture update 270 stage. The Architecture updates 270 commits registers to memory/cache and allows the out-or-order register file mapper to free up renamed registers.

Figure 3:
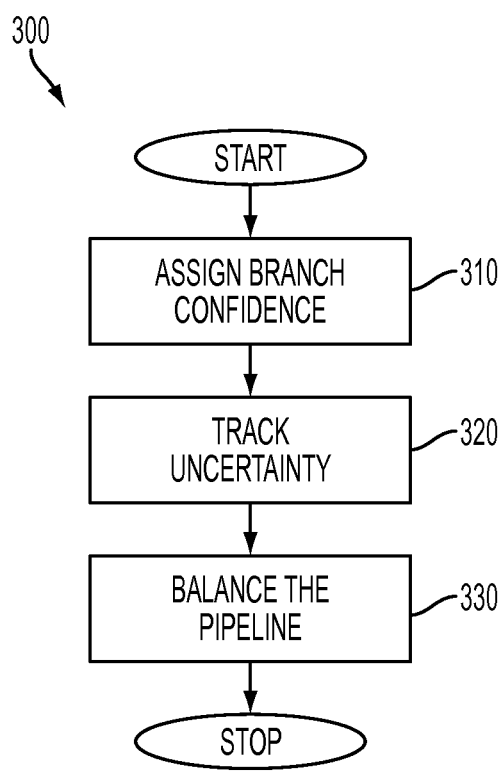
FIG. 3 illustrates a flow chart for a method of instruction balancing within a multi-threaded processor through instruction uncertainty.

FIG. 3 illustrates a flow chart for a method 300 of instruction balancing within a multi-threaded processor through instruction uncertainty. At block, 310 the system 100 assigns branch confidence. Branch predictors can implement many types of counters, including but not limited to a one-bit predictor or a two-bit saturating counter. For illustrative purposes, a two-bit saturating counter is discussed. It will be appreciated that other types of prediction counters are contemplated in other exemplary embodiments. Several states can be represented for branch direction of a given predicted branch. For example, the states represented can be: 11 strongly taken, 10 weakly taken, 01 weakly not taken, 00 strongly not taken. In exemplary embodiments, by maintaining an x-bit counter of correct and an x-bit counter of wrong, the running average of correctness can be established for the branch prediction. For each time the branch is predicted correct (independent of taken or not taken), the system 100 increments the "correct" counter. For each time the prediction is wrong, the system 100 increments the "wrong" counter. Whenever a counter saturates at its maximum value, the system 100 divides both counters by two. For example, the division by two can be accomplished by right shifting each counter by one bit. In exemplary embodiments, the confidence of the predicted branches is stored in branch prediction arrays with the direction prediction. Whenever a prediction is made, the uncertainty is also acquired. In one embodiment, the uncertainty can be given by:

$$1/\text{Confidence} = \text{Wrong}/(\text{Correct} + \text{Wrong})$$

At block 320, the system 100 tracks the uncertainty of the predicted branch. In exemplary embodiments, when the uncertainty for a branch has the wrong count being greater than 0 then there is a level of uncertainty about the predicted branch. The uncertainty indicates that in the recent past, as per the counters, the prediction has been wrong. No matter what the uncertainty of the given branch, there is no question about executing the branch in the pipeline as per the uncertainty of the branch itself; it is the instructions after the branch that are in question.

For example, if a given branch has an uncertainty of '1', then each instruction that is sent down the pipeline 200 after the branch is also treated as having an uncertainty of '1'. As such, if, for example, ten instructions are sent down the pipeline 200 after the branch, then the given thread has sent down uncertainty valued at 10. If after the first branch, there are four non-branch instructions, and then another branch that has an uncertainty of '2', followed by another five instructions, then the total uncertainty in the pipeline 200 for this thread is '20'. In this example, it can be appreciated that the first branch does not add uncertainty to the pipeline 200. However, the next four non-branch instructions each have an uncertainty of '1'. (total uncertainty to this point='4'). The second branch is down the uncertainty path of the first branch. The second branch therefore adds one more to the uncertainty count. (total now at '5'). The instructions after the second branch each have an uncertainty of '2' for the second branch and a '1' for the first branch summing to a value of '3' uncertainty for each instruction after the second branch. The uncertainty is five instructions at a value of '3' for a total of 15 uncertainty. In total for the ten instructions, there is an uncertainty of '20'. In continuing with the example, should the first branch resolve correctly (second branch still to be resolved), then the uncertainty in the pipe for the ten instructions after the first branch drops from '20' to '10' as the first branch is no longer providing uncertainty in the pipeline 200. Instead, should the second branch resolve correctly (first branch still to resolve) the uncertainty also drops from '20' to '10' as the last five instructions valued at '2' each no longer are adding uncertainty to the pipeline 200. Should both branches resolve correctly, then the level of uncertainty in the pipeline is '0' as now there are no branches in the pipeline which have yet to resolve.

FIG. 4 illustrates an example of a table 400 that can be implemented to track uncertainty in the pipeline 200. In the example, the table includes a confidence value column 410, each row of the column representing a current uncertainty value summation for an instruction as it encounters branches in the pipeline 200. The implementation of "triplets" in an example of how to track group of instructions for out-of-order tracking 260 such that instructions can make architected updates 270 in order at a rate of faster than one instruction per cycle. For the given example, within a triplet there are instruction slots 0, 1 and 2. Branches are supported in any of the slots; however, a branch in slot 1 or 2 ends instructions within the given triplet. In the first row 420, the instruction, Instr, has a '0' uncertainty in the pipeline 200. The uncertainty of '0' is illustrated underneath Instr. In the second row 430, the instruction encounters a branch having an uncertainty of '1', Br(1). The uncertainty for the instruction is now '1', which is illustrated as '1', underneath Instr. In the second row 430, the instruction then encounters a branch with uncertainty '3', Br(3). The uncertainty associated with the instruction is now '4', as placed in the column 410 at the row 440. In row 440 the instruction is in the pipeline 200 with an uncertainty '4' underneath Instr. Thus in row 450, the column 410 remains at an uncertainty '4'. However, in row 450, the instruction encounters another branch with uncertainty '2', Br(2). The uncertainty associated with the instruction is now '6'. As such, in row 460, the column 410 now reads an uncertainty '6', which remains with the instruction in the pipeline 200. As such, it is appreciated that uncertainty for the triplet (i.e., each row) is the (triplet summation value*number of instructions in the triplet)+(oldest branch uncertainty*number of instructions younger than older branch in the triplet).

At block 330, the system 100 balances the pipeline 200. In exemplary embodiments, to keep the pipeline 200 balanced with instructions that are most likely to complete from each thread, the pipeline 200 dispatches instructions 230 from each thread such that the level of uncertainty per thread, post-dispatch, in the pipeline 200 is balanced. With respect to the out-of-order issue engine, each thread has its own age priority and the decision between which thread to issue between the two threads is based on keeping the level of uncertainty also balanced. In this way, instructions are sent in to the pipeline that are most likely to perform work rather than be flushed out of the pipeline at a later point in time. The instructions with higher confidence (less uncertainty) are thus given priority.

In the pipeline 200, instructions are queued for issue. Similar to conventional pipelines, the pipeline 200 fetches 210, decodes 220, and dispatches 230 instructions in order. However, also similar to convention pipelines, instructions are often queued and issued out of order 240. In exemplary embodiments, the issuing of instructions takes into account both the uncertainty of instructions as well as the age of the instructions. In balancing the pipeline 200, the system 100 takes into account the uncertainty of an instruction position while at the same time dispatching the instructions as evenly as possible to balance the uncertainty in the pipeline, while also increasing the number of instructions that are likely to perform work which influences the architected state. In exemplary embodiments, to keep the uncertainty of instructions in the pipeline equal, a ratio of the uncertainty is calculated and the instructions are dispatched according to the ratio. For example, if thread X has an uncertainty summation of 50 and thread Y has an uncertainty summation of 25, then the ratio of uncertainties is 2/1. According to this ratio, twice as many instructions for thread Y are dispatched for each instruction of thread X that is dispatched. In this way, while the uncertainty of X will continue to increase beyond 50, Y will increase beyond 25 at a rate faster than X is increasing beyond 50. As such, the uncertainty within the pipeline of the two threads moved towards a point of uncertainty equilibrium. By achieving a point of equilibrium, it is statistically likely that the optimal minimal amount of work will be flushed out of the pipeline 200. It can be appreciated that the ratio can change at any time, because branches may resolve and uncertainties can change. For example, the uncertainty for thread X may go to 60 and the uncertainty for thread Y may go to 40, in which case the ratio becomes 3/2. In such a case, three instructions for thread Y will be dispatched for every two instructions for thread X, again, to balance the uncertainty in the pipeline 200 and to increase the chances for work to be performed which influences the architectural state of the machine. In another example, a branch may resolve for thread X, dropping the uncertainty to 30, thereby having a ratio of 3/4. In such a case, three instructions for thread Y will be dispatched for every four instructions for thread X, again, to balance the uncertainty in the pipeline 200 and to increase the chances for work to be performed which influences the architectural state of the machine.

As described herein, another consideration in pipeline balancing is taking into account the age of the instruction to be issued. Conventionally, pipelines issue the oldest instruction, with valid data, in the issue queue. In exemplary embodiments, instructions are dispatched based on the age of the instruction as well as the uncertainty of the instruction. For each thread, the oldest instruction which is valid for being issued examines the summation of uncertainty of instructions up to that point in the pipeline 200 and the instruction from the given thread which has the least uncertainty is the instruction which is to be issued. In the case that the uncertainties are equal across the threads, then a round-robin selection between the threads for issue may be applied. For example, if thread X has its oldest valid instruction to be issued being defined as a summation of uncertainty being 30 and thread Y has its oldest valid instruction to be issued being defined as a summation of uncertainty being 10 then the instruction for thread Y is issued, as described above. When more than one instruction is to be issued on a given cycle, this comparison is repeated for each instruction slot that is to be filled by instruction issue on the given cycle.

Figure 5:
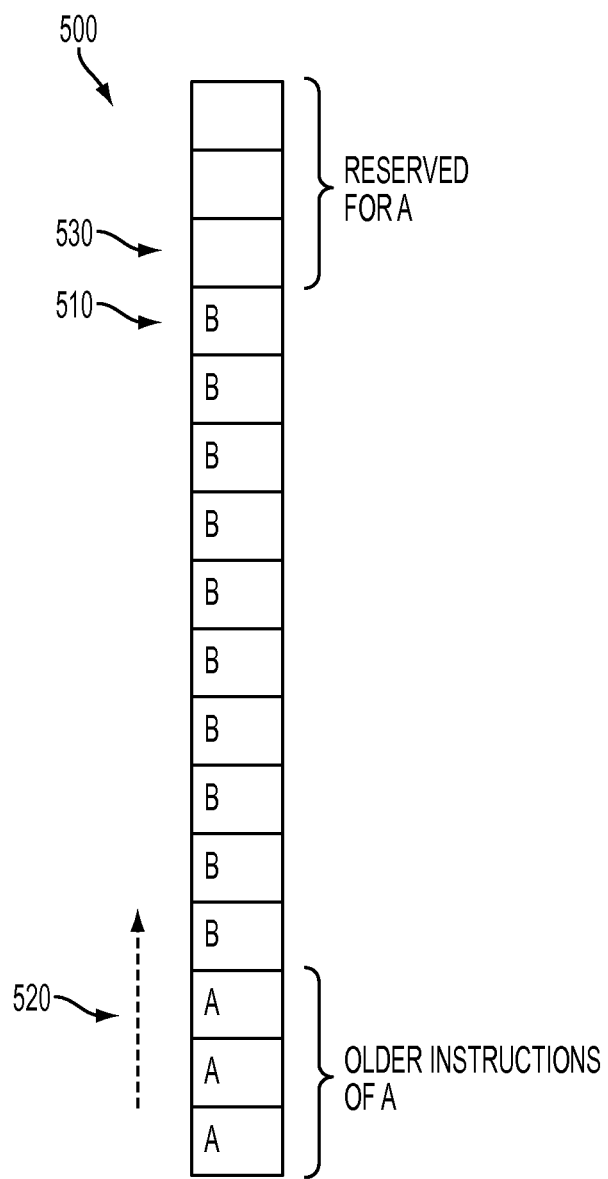
FIG. 5 diagrammatically illustrates an example of a static watermark that can be implemented in accordance with exemplary embodiments.

In exemplary embodiments, the systems and methods described herein implement a static watermark scheme. FIG. 5 diagrammatically illustrates an example of a static watermark issue queue 500 that can be implemented in accordance with exemplary embodiments. The static watermark establishes a threshold for a number of instructions for one thread to be dispatched given the other thread is stalled so that a given thread, B, does not hog the issue queue during a time frame when the other thread, A, does not have any instructions available to place into the issue queue. In the example, thread A and thread B both have instructions as a function of fetch to be dispatched. In the example, thread B is taking up the majority of the resources because, for example, thread A may be experiencing a long latency instruction fetch. As such, a large number of thread B instructions are dispatching into the issue queue while A is off instruction fetching additional instructions to be decoded and placed into the issue queue. Conventionally, an issue queue would allow thread B to continue to use the resources. In exemplary embodiments, the threshold is set to ensure that some thread A instructions can be dispatched as well by reserving space in the issue queue for thread A. Once the instructions for thread B reaches a watermark level 510 (a given percentage of the issue queue), dispatching of instructions from thread B into the queue is stopped. Even if thread A is not ready to dispatch instructions, it has N number of spaces reserved in the issue queue into which to dispatch instructions. When thread A recovers from the long latency operation, there will be available spots in the issue queue for thread A's instructions. The example illustrates a head pointers 520 and a tail pointer 530. The head pointer 520 is the head of the round robin issue queue and defines the oldest instruction in the queue, and the tail pointer 530 is an additional pointer that defines where the next instruction is to be inserted into the queue. In exemplary embodiments, the tail pointer 530 points to the first slot after the watermark threshold 510. B was allowed to continually dispatch instructions into the tail pointer position of the issue queue until the watermark 510 was reached. At this point the tail pointer moves one spot past the watermark to denote the position of the issue queue that the next instruction is to be dispatched into. Instructions of thread A after completion of the long latency operation now have slots in the issue queue for dispatching into. In such a scheme, while the ratio of uncertainty has most likely drifted away from equilibrium, the watermark has prevented the ratio from becoming more excessive than it has already become.

Figure 6:
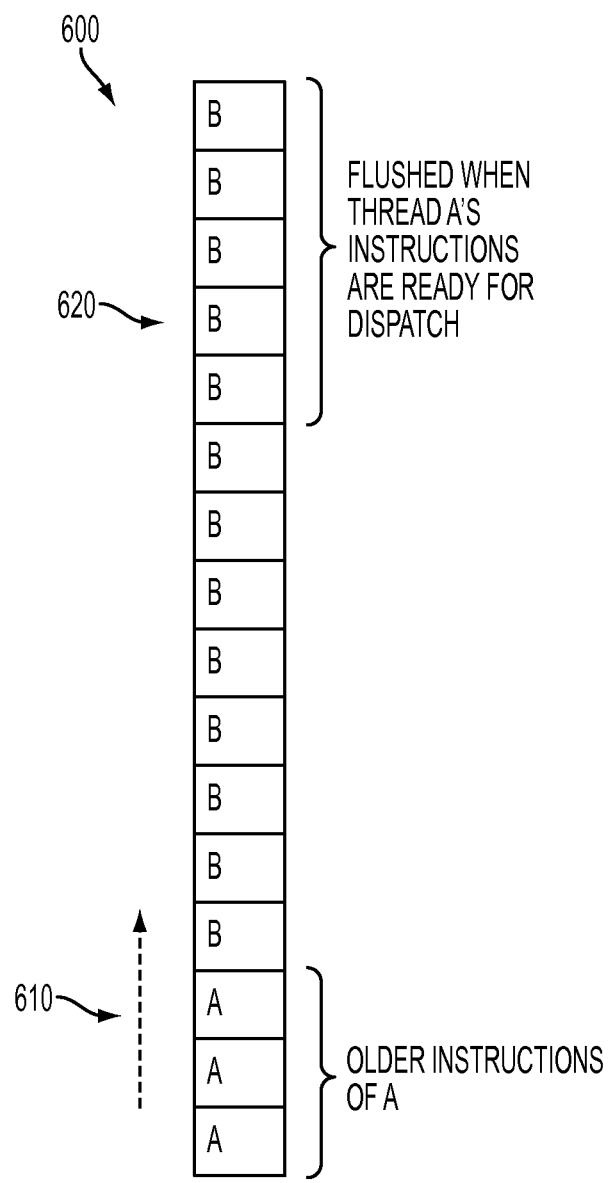
FIG. 6 diagrammatically illustrates an example of a flush from issue queue that can be implemented in accordance with exemplary embodiments.

In exemplary embodiments, the systems and methods described herein can implement a flush from issue scheme. FIG. 6 diagrammatically illustrates an example of a flush from, issue queue 600 that can be implemented in accordance with exemplary embodiments. Instructions can be flushed from the issue queue so that there is a balance of uncertainty of dispatched instructions in the issue queue. In the example, thread A and thread B both have instructions in the issue queue to be dispatched. Thread B is taking up the majority of resources because, for example, thread A may be experiencing a long latency instruction fetch operation. As such, a large number of thread B instructions are dispatching into the issue queue which is moving the uncertainty ratio of the two threads away from equilibrium. It is unknown how long thread A will be stalled and as such, thread B can gain additional performance by using the full issue queue as it would otherwise sit there unused, for thread A has no instructions available for placing into the issue queue. In exemplary embodiments, when the instructions for thread A become available for insertion in the issue queue, the pipeline 200 can flush N younger instructions of thread B from the issue queue, and re-dispatch them after dispatching the instructions for thread A which balances out the issue queue uncertainty. A head pointer 610 is the head of the round robin issue queue which defines the oldest instruction in the issue queue. A tail pointer 620 defines the next slot an instruction is to be inserted into the issue queue. A given number of B's can be flushed from the queue and the B pointer can be moved closer to the head pointer 610 as to establish a number of thread B instructions to be flushed as described herein. In exemplary embodiments, to avoid re-fetching the instructions for thread B, the instructions can be held in the "ghost" (virtual) instruction queue, which can be an extension of the queuing that holds instructions from instruction fetch prior to being dispatched 230.

Figure 7:
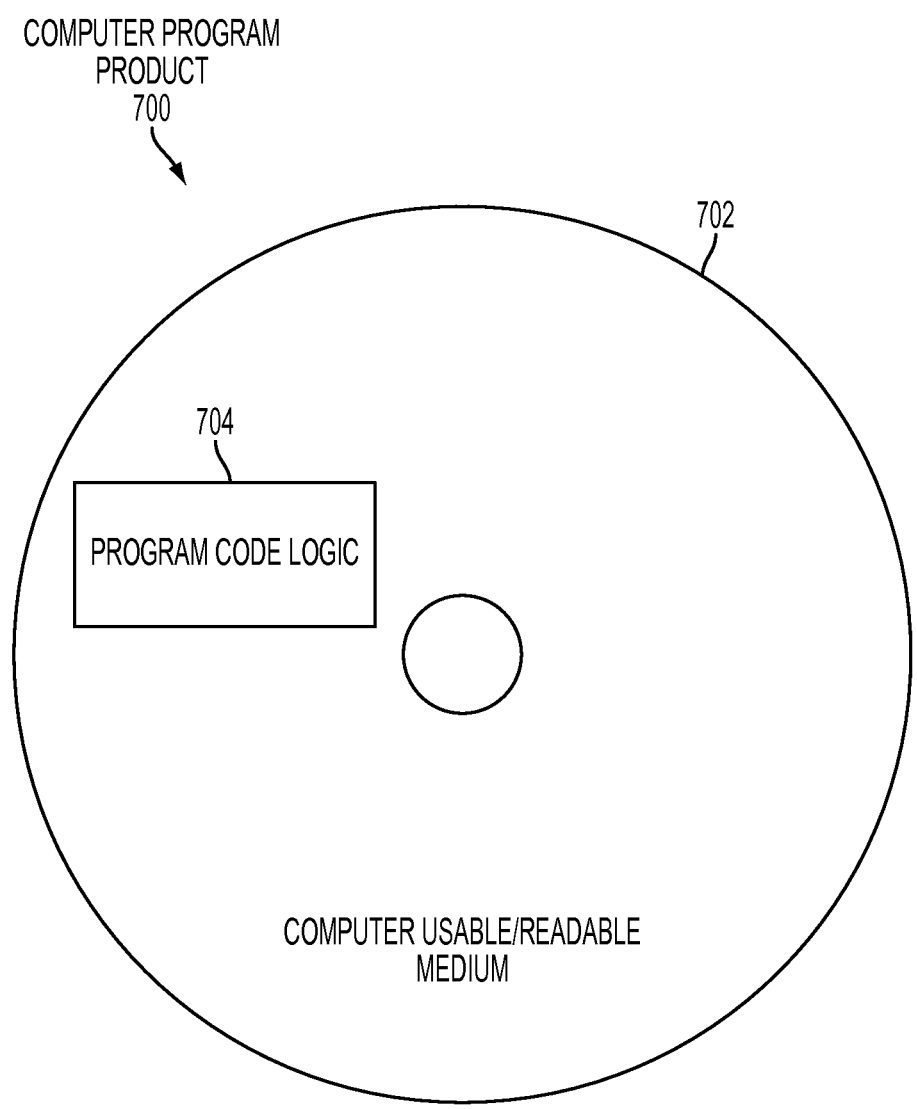
FIG. 7 illustrates an example of a computer program product on a computer readable/usable medium with computer program code logic embodied in tangible media as an article of manufacture.

As described above, embodiments can be embodied in the form of computer-implemented processes and apparatuses for practicing those processes. An embodiment may include a computer program product 700 as depicted in FIG. 7 on a computer readable/usable medium 702 with computer program code logic 704 containing instructions embodied in tangible media as an article of manufacture. Exemplary articles of manufacture for computer readable/usable medium 702 may include floppy diskettes, CD-ROMs, hard drives, universal serial bus (USB) flash drives, or any other computer-readable storage medium, wherein, when the computer program code logic 704 is loaded into and executed by a computer, the computer becomes an apparatus for practicing the invention. Embodiments include computer program code logic 704, for example, whether stored in a storage medium, loaded into and/or executed by a computer, or transmitted over some transmission medium, such as over electrical wiring or cabling, through fiber optics, or via electromagnetic radiation, wherein, when the computer program code logic 704 is loaded into and executed by a computer, the computer becomes an apparatus for practicing the invention. When implemented on a general-purpose microprocessor, the computer program code logic 704 segments configure the microprocessor to create specific logic circuits.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer system for instruction execution, the system comprising:
   a processor having a pipeline,
   wherein the system is configured to perform a method, comprising:
   fetching, in the pipeline, a plurality of instructions, wherein the plurality of instructions includes a plurality of branch instructions and a plurality of non-branch instructions;
   assigning a branch uncertainty to each of the plurality of branch instructions;
   for each of the plurality of instructions, assigning an instruction uncertainty that is a summation of branch uncertainties of older unresolved branches;
   determining a first summation of instruction uncertainties of instructions associated with a first thread that are currently in the pipeline;
   determining a second summation of instruction uncertainties of instructions associated with a second thread that are currently in the pipeline; and
   balancing dispatching of instructions associated with the first thread and instructions associated with the second thread into the pipeline based on the first summation of instruction uncertainties and the second summation of instruction uncertainties.

2. The computer system as claimed in claim 1 wherein the balancing further comprises calculating an uncertainty ratio between the first thread and the second thread based on the first summation of instruction uncertainties and the second summation of instruction uncertainties.

3. The computer system as claimed in claim 2 wherein the instructions are dispatched proportionally between the first thread and the second thread based on the uncertainty ratio calculated between the first thread and the second thread.

4. The computer system as claimed in claim 1 wherein the method further comprises reserving an issue queue space for a subset of the plurality of branch instructions.

5. The computer system as claimed in claim 1 wherein the balancing further comprises flushing from the pipeline one or more instructions associated with the first thread in response to one or more instructions associated with the second thread becoming available for dispatch.

6. The computer system as claimed in claim 1 wherein assigning a branch uncertainty to each of the plurality of branch instructions comprise determining the confidence of each of the plurality of branch instructions, wherein the uncertainty comprises an inverse of the confidence.

7. A computer program product for instruction execution in a pipeline, the computer program product comprising:
   a non-transitory tangible storage medium readable by a processing circuit and storing instructions for execution by the processing circuit for performing a method comprising:
   fetching, in the pipeline, a plurality of instructions, wherein the plurality of instructions includes a plurality of branch instructions and a plurality of non-branch instructions;

assigning a branch uncertainty to each of the plurality of branch instructions;

for each of the plurality of instructions, assigning an instruction uncertainty that is a summation of branch uncertainties of older unresolved branches;

determining a first summation of instruction uncertainties of instructions associated with a first thread that are currently in the pipeline;

determining a second summation of instruction uncertainties of instructions associated with a second thread that are currently in the pipeline; and balancing dispatching of instructions associated with the first thread and instructions associated with the second thread into the pipeline based on the first summation of instruction uncertainties and the second summation of instruction uncertainties.

8. The computer program product as claimed in claim 7 wherein the balancing further comprises calculating an uncertainty ratio between the first thread and the second thread based on the first summation of instruction uncertainties and the second summation of instruction uncertainties.

9. The computer program product as claimed in claim 8 wherein the instructions are dispatched proportionally between the first thread and the second thread based on the uncertainty ratio calculated between the first thread and the second thread.

10. The computer program product as claimed in claim 7 wherein the method further comprises reserving an issue queue space for a subset of the plurality of instructions.

11. The computer program product as claimed in claim 7 wherein the balancing further comprises flushing from the pipeline one or more instructions associated with the first thread in response to one or more instructions associated with the second thread becoming available for dispatch.

12. The computer program product as claimed in claim 7 wherein assigning a branch uncertainty to each of the plurality of branch instructions comprise determining the confidence of each of the plurality of branch instructions, wherein the uncertainty comprises an inverse of the confidence.

* * * * *